US008935419B2

(12) United States Patent
Takeshima et al.

(10) Patent No.: US 8,935,419 B2
(45) Date of Patent: Jan. 13, 2015

(54) FILTERING DEVICE FOR DETECTING HTTP REQUEST AND DISCONNECTING TCP CONNECTION

(71) Applicant: Hitachi, Ltd., Tokyo (JP)

(72) Inventors: Yoshiteru Takeshima, Tokyo (JP); Naoki Haraguchi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 239 days.

(21) Appl. No.: 13/667,405

(22) Filed: Nov. 2, 2012

(65) Prior Publication Data

US 2013/0151587 A1 Jun. 13, 2013

(30) Foreign Application Priority Data

Nov. 4, 2011 (JP) ................. 2011-241840

(51) Int. Cl.
*G06F 15/16* (2006.01)
*H04L 29/08* (2006.01)
*H04L 29/06* (2006.01)

(52) U.S. Cl.
CPC ........ *H04L 29/0809* (2013.01); *H04L 63/0281* (2013.01); *H04L 63/10* (2013.01); *H04L 63/1458* (2013.01); *H04L 69/163* (2013.01)
USPC ........... 709/229; 709/223; 709/224; 709/225; 709/226; 709/228

(58) Field of Classification Search
USPC ......... 709/223, 224, 225, 226, 227, 228, 229, 709/206, 217, 231, 220, 230; 370/328, 241
See application file for complete search history.

(56) References Cited

U.S. PATENT DOCUMENTS

| | | | | |
|---|---|---|---|---|
| 2010/0250681 A1* | 9/2010 | Van Wely | ....................... | 709/206 |
| 2010/0325299 A1* | 12/2010 | Rao et al. | ....................... | 709/230 |
| 2011/0058482 A1* | 3/2011 | Nomura et al. | ................ | 370/241 |
| 2011/0270956 A1* | 11/2011 | McDysan et al. | ............. | 709/220 |
| 2011/0283011 A1* | 11/2011 | Li et al. | .......................... | 709/231 |
| 2012/0059907 A1* | 3/2012 | Vange et al. | ................... | 709/217 |
| 2012/0198004 A1* | 8/2012 | Watte | ............................ | 709/206 |
| 2012/0275383 A1* | 11/2012 | Matsukawa | ................... | 370/328 |

FOREIGN PATENT DOCUMENTS

JP 2010-244134 A 10/2010

* cited by examiner

*Primary Examiner* — Le H Luu

(74) *Attorney, Agent, or Firm* — Foley & Lardner LLP

(57) ABSTRACT

In a system without a TCP termination process at normal times, and in the case where a URL within an HTTP access is extracted from reception packets, a passage/access refusal determination of the URL is performed, and a determination result is an access refusal, the TCP termination process is performed, a filtering device has the possibility that when an UTTP access as a disconnect case is frequently performed, it is erroneously recognized as a DoS attack on the side of the Web server device. A network system has a detection unit of frequent accesses to access control object data in the same Web server device from the same client device and a disconnect unit of a TCP connection to the Web server device after detection through the detection unit.

12 Claims, 15 Drawing Sheets

FIG. 2

| CONNECTION SOURCE IP ADDRESS 2211 | USER TYPE 2212 | CONNECTION DESTINATION IP ADDRESS 2213 | ACCESS CONTROL PARAMETER 2214 | CONTROL COUNTER 2215 | EXPIRATION DATE 2216 |
|---|---|---|---|---|---|
| 192.168.1.3 | FILTER OBJECT | 192.168.201.83 | CONTROL OBJECT | 2 | 2013/8/21 20:19:01 |
| 192.168.1.3 | FILTER NON-OBJECT | 192.168.203.18 | CONTROL OBJECT | 3 | 2013/8/21 20:19:02 |
| --- | | --- | | --- | |

221A COMMUNICATION MANAGEMENT TABLE

FIG. 10

| CONNECTION SOURCE IP ADDRESS | USER TYPE | CONNECTION DESTINATION INFORMATION | CONTROL COUNTER | EXPIRATION DATE |
|---|---|---|---|---|
| 2211 | 2212 | 2217 | 2215 | 2216 |
| 192.168.1.3 | FILTERING OBJECT | #1 | 2 | 2013/8/21 20:19:01 |
| 192.168.2.4 | FILTERING OBJECT | #2 | 3 | 2013/8/21 20:19:02 |
| ⋮ | | ⋮ | ⋮ | |

221B COMMUNICATION MANAGEMENT TABLE

FIG. 11

231 ACCESS CONTROL MANAGEMENT TABLE

| # | | | |
|---|---|---|---|
| #1 | DESTINATION HOST NAME | xxx1. example. com | 2311 |
| | IP ADDRESS 1 | 192. 168. 200. 82 | 2312A |
| | IP ADDRESS 2 | (N/A) | 2312B |
| | IP ADDRESS 3 | (N/A) | 2312C |
| | --- | --- | |
| | ACCESS CONTROL PARAMETER | CONTROL OBJECT | 2313 |
| | EXPIRATION DATE | 2013/8/21 20:19:01 | 2314 |
| #2 | DESTINATION HOST NAME | xxx2. example. com | |
| | IP ADDRESS 1 | 192. 168. 201. 83 | |
| | IP ADDRESS 2 | 192. 168. 203. 18 | |
| | IP ADDRESS 3 | 192. 168. 204. 220 | |
| | --- | --- | |
| | ACCESS CONTROL PARAMETER | CONTROL OBJECT | |
| | EXPIRATION DATE | 2013/8/21 20:19:02 | |
| #3 | DESTINATION HOST NAME | | |
| | --- | --- | |

FILTERING DEVICE FOR DETECTING HTTP REQUEST AND DISCONNECTING TCP CONNECTION

BACKGROUND OF THE INVENTION

The subject matter disclosed herein relates generally to a filtering system and a filtering method which perform filtering of HTTP (Hyper Text Transfer Protocol) communication between a client and a service provision server.

The filtering system of conventional HTTP communication includes an HTTP proxy system and a transmission proxy system (see, e.g., JP-A-2010-244134 (referred to as Literature 1), paragraph numbers 0002 to 0005).

However, the following problems are indicated to the above systems.

In the first HTTP proxy system, in the case where an HTTP client fails to perform setting for using an HTTP proxy, filtering cannot be performed (Literature 1, paragraph number 0006).

On the other hand, in the second transmission proxy system, since a termination process of a TCP (Transmission Control Protocol) session is complicated and a process through software is required, throughput is reduced (Literature 1, paragraph numbers 0007 and 0008).

To solve the above problems, there is proposed a system in which a TCP termination process is not performed at normal times, and in the case where a URL in a request line of an HTTP access is extracted from reception packets, a passage/access refusal determination of URL is performed, and a determination result is an access refusal, the TCP termination process is performed (Literature 1, paragraph numbers 0013 and 0014).

SUMMARY OF THE INVENTION

However, in the technology disclosed by Literature 1, in the case of disconnecting (controlling) an access from a client, a TCP 3 way-handshake is transmitted and transferred once from a client to a Web server to establish a TCP connection and then an access is refused is determined, thus performing a TCP termination process of the server side (Literature 1, paragraph numbers 0030 to 0034, and FIG. 3).

In this method, a Web server recognizes that after a TCP connection is performed, a TCP disconnect is performed from the client side without receiving an HTTP request.

In the case the above-described process is frequently performed, it is erroneously recognized as a DoS (Denial of Service) attack on the Web server side. A Web server manager may take security measures such as an access disconnect in an IP address base to the connection from a network of the client side.

When an access is disconnected, there is a drawback in which a client coupled to the network of the client side becomes unable to be coupled to the Web server from now on.

To avoid the above problem, even in the case of disconnecting an access, a sequence in which after the TCP connection from the filtering device to the Web server, the TCP is disconnected without transmitting an HTTP request to the Web server ought not to be frequently performed.

To solve the above problem, a disclosed filtering system has a configuration in which frequent TCP connections to the service is capable of being disconnected when a service provided by a service server device (hereinafter, collectively referred to as a Web server device) of a Web server device is an access control object for an access user.

As a first feature, the filtering system specifically has a detection unit for frequent accesses to access control object data in the same Web server from the same client and a disconnect unit for a TCP connection to the Web server after the detection through the detection unit.

As a second feature, in the case where a plurality of Web servers which provide the certain same access control object data are present and a plurality of different IP addresses among response data units at the time of solving a DNS (Domain Name System) name for a certain host name are described, the filtering system further treats as the same an access to access control object data of the Web server group having the plurality of different IP addresses, and has a disconnect unit for a TCP connection to the Web server group after the detection through the detection unit.

As a third feature, the filtering system further has an access disconnect unit at a name resolution request of the Web server which provides the access control object data after the detection through the detection unit at the time of solving a name for a host name of the Web server from the client.

According to one aspect, there is provided a network system which includes: a client device; a service server device; and a filtering device including a first function of relaying a TCP connection established between the client device and the service server device, and an HTTP request and an HTTP response transmitted and received by using the TCP connection, and a second function of disconnecting an access to an access control object service provided by the service server device from the client device, wherein: the filtering device includes a filtering processing unit which performs detection processing and disconnect processing; the detection processing is a process for detecting frequent HTTP accesses to the same access control object service provided by the service server device from the same client device through an establishment request of the TCP connection used by the HTTP access; and the disconnect processing is a process in which when an establishment request of the TCP connection used by the frequent HTTP accesses is detected through the detection processing, establishment and disconnect of the TCP connection in which the filtering device is coupled as a termination are performed without transferring an establishment request of the TCP connection to the service server device.

In the disconnect processing, when receiving an HTTP request from the client device using the established TCP connection, the filtering processing unit transmits an access control message to the client device, and disconnects the TCP connection.

In the detection processing, the filtering processing unit transfers an establishment request of the TCP connection to the service server device and establishes the requested TCP connection when determining that an establishment request of the TCP connection is not an establishment request of the TCP connection in which frequent HTTP accesses to the access control object service are used; and counts up the number of the HTTP requests to determine whether the HTTP request is the frequent accesses when the HTTP request in which the established TCP connection is used is an HTTP request to the access control object service.

The filtering processing unit correspondingly manages a connection source IP address of the client device, a connection destination IP address to service provided by the service server device, and information indicating whether the service provided by an access to the connection destination IP address is an access control object through a user of the client device.

In the detection processing, the filtering processing unit transfers a name resolution request received from the client device to a name resolution server and receives a name resolution response from the name resolution server; and sets a connection destination IP address included in the received name resolution response to the managed connection destination IP address, and correspondingly manages the connection destination IP address and a URL included in the name resolution request.

In the detection processing, the filtering processing unit correspondingly manages one of the managed URLs and a plurality of connection destination IP addresses included in the name resolution response received from the name resolution server.

In the detection processing, the filtering processing unit identifies the client device and the service server device, preserves as a counter value the number of the HTTP requests for a given length of time from the connection source IP address of the client device to the access control object data; and considers that the frequent accesses occur when the counter value is greater than a certain threshold.

According to another aspect, there is provided a network system which includes: a client device; a service server device; and a filtering device including a first function of relaying an HTTP request and an HTTP response between the client device and the service server device and a second function of disconnecting an access to an access control object service provided by the service server device from the client device, wherein: the filtering device has a filtering processing unit which performs detection processing and disconnect processing; correspondingly manages a connection source IP address of the client device, a included in a name resolution request received from the client device, a connection destination IP address included in a name resolution response received from a name resolution server, and information indicating whether the service provided by an access to the connection destination IP address is an access control object through a user of the client device; detects a name resolution request of the service server device from the client device in the detection processing, and disconnects an access to the access control object service when responding an IP address of another server device different from the service server device as a response for the name resolution request in the disconnect processing.

The network system further includes a Sorry server device which responds an access control message, wherein: in the disconnect processing, the filtering processing unit responds an IP address of the Sorry server device to the client device as a response for the name resolution request; and allows the client device to perform an establishment request of the TCP connection and an HTTP request between its own device and the Sorry server device.

According to the disclosure, in a subsequent process, even in the case of disconnecting an access from a client, the filtering device reduces the possibility that it is erroneously recognized as a DoS attack by a Web server manager.

Other objects, features and advantages of the invention will become apparent from the following description of the embodiments of the invention taken in conjunction with the accompanying drawings.

BRIEF DESCRIPTION OF THE DRAWINGS

FIG. 2 illustrates a configuration example of a communication management table of a filtering device 20 according to a first embodiment;
FIG. 10 illustrates a configuration example of a communication management table of a filtering device 20 according to a second embodiment;
FIG. 11 illustrates a configuration example of an access control management table of a filtering device 20 according to a second embodiment.

DESCRIPTION OF THE EMBODIMENTS

Figure 1:
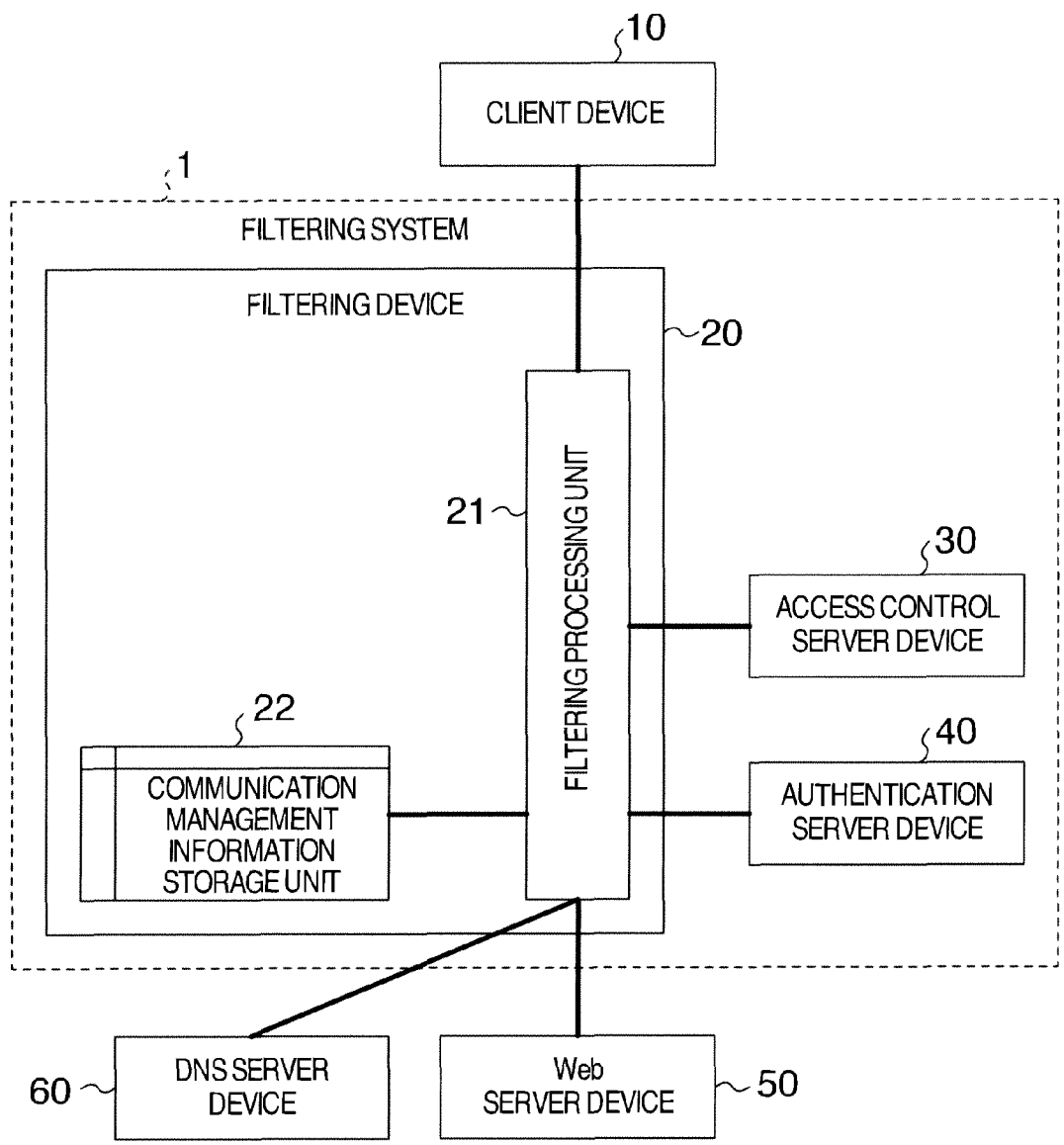
FIG. 1 illustrates a configuration example of a filtering system according to a first embodiment.

Embodiments of the present invention will be described below with reference to the accompanying drawings.

In the case where a system has circuit elements to which the same reference numerals are given or a process has steps to which the same step numbers are given, the system has the same function and the process performs the same processing content, respectively.

First Embodiment

FIG. 1 is a block diagram illustrating a configuration example of a filtering system 1 disclosed in the specification.

The filtering system 1 includes a filtering device 20, an access control server device 30, and an authentication server device 40.

The filtering system 1 is capable of communicating with one or more client devices 10, a Web server device 50, and a DNS server device 60, respectively, via a network such as a LAN (Local Area Network) or wireless network.

By using a protocol on a TCP/IP such as an HTTP (Hyper-Text Transfer Protocol), the client device 10 is coupled to the Web server device 50 and performs a service request. Before accessing the Web server device 50, the client device 10 transmits a name resolution request of a representative domain name of the Web server device 50 to the DNS server device 60 by using a DNS protocol. The client device 10 then receives an IP address of the Web server device 50 as a response therefor.

The Web server device 50 operates a server process for providing a Web service for the client device 10.

The DNS serves device 60 is a server device which provides a name resolution service.

When receiving an access control parameter request for a certain URL, the access control server device 30 is a server device which searches a URL database and responds an access control parameter indicating whether the URL is an access control object.

The authentication server device 40 is a server device which receives information for identifying a user and a user authentication request and which responds user type information indicating whether the user is a filtering object user.

Here, examples of the information for identifying users include an IP address and user ID data.

The filtering device 20 fliers HTTP communication between the client device 10 and the Web server device 50.

Figure 15:
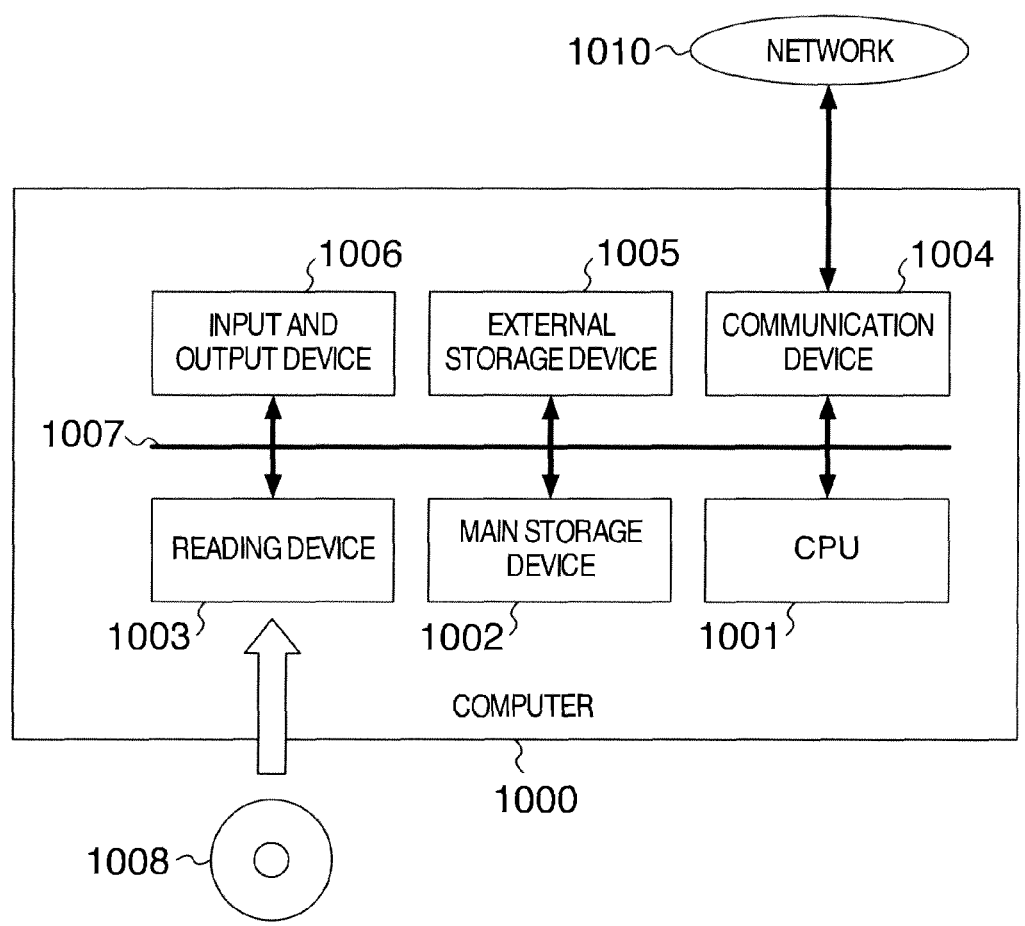
FIG. 15 illustrates a hardware configuration example of each device.

FIG. 15 illustrates a hardware configuration example of each server device such as the client device 10, filtering device 20, access control server device 30, authentication server device 40, Web server device 50, and DNS server device 60.

The above-described server devices can be deployed by using a general computer 1000 including a CPU 1001, a main storage device 1002, an external storage device 1005 such as an HDD, a reading device 1003 which reads information from a storage media 1008 having portability such as a CD-ROM and a DVD-ROM, an input and output device 1006 such as a display, a keyboard, and a mouse, a communication device 1004 such as a NIC (Network Interface Card) for coupling to a network 1010, and an internal communication line 1007 such as a bus for coupling between the above-described devices. For example, a communication management table 221 described later is implemented by using a partial area of the main storage device 1002.

Each device loads various programs stored in each external storage device 1005 in the main storage device 1002 and executes them by using the CPU 1001. By using the communication device 1004, each device further is coupled to the network 1010 and performs network communication with the client device 10 and the other server devices. Through the process, various processing units of the present embodiment and various processes through them are implemented.

The filtering device 20 has a filtering processing unit 21 and a communication management information storage unit 22. The communication management information storage unit 22 has a communication management table 221.

The filtering processing unit 21 controls all the communication processes performed by the filtering device 20.

Here, details of the communication management table 221 will be described with reference to FIG. 2.

The communication management table 221 (referred to as 221A) according to the first embodiment has a connection source IP address field 2211, a user type field 2212, a connection destination IP address field 2213, an access control parameter field 2214, a control counter 2215, and an expiration date field 2216.

The connection source IP address field 2211 is an area for storing an IP address of the client device 10 as a connection source. The IP address of the client device 10 is obtained from a transmission source IP address header of a SYN packet at the time of starting a TCP connection from the client device 10 to the Web server device 50.

The user type field 2212 is an area for storing user type information indicating whether a user is a filtering object through the client device 10. The user type information is obtained based on inquiry results to the authentication server 40.

The connection destination IP address field 2213 is an area for storing an IP address on the side of the Web server device 50 as a connection destination, of the communication from the client device 10 to the Web server device 50. The connection destination IP address is obtained from a transmission destination IP address header of a SYN packet at the time of starting a TCP connection from the client device 10 to the Web server device 50.

The access control parameter field 2214 is an area for storing a value (access control parameter) indicating whether data is an access control object through the Web server device 50 indicated by a value of the connection destination IP address 2213. An access control parameter request is transmitted to the access control server device 30 and the access control parameter is obtained from the received response results.

Among the HTTP requests transmitted to the Web server device 50 indicated by the connection destination IP address 2213, the control counter 2215 is a counter area indicating a value in which a destination URL performs access control in the predetermined time as an access control object based on the access control parameter responded from the access control server device 30. The filtering processing unit 21 counts up a value of the control counter 2215 each time receiving the HTTP request to an access control object URL.

The expiration date field 2216 is an area for storing an expiration date of each entry of the communication management table 221. Suppose that a value of the expiration date 2216 of the entry obtained by conducting search by using as a search keyword a connection source IP address and/or a connection destination IP address is a previous date before the present date. In this case, the entry is set to be invalid and the control counter 2215 is cleared. Then, an entry is freshly created again, or the entry is overwritten and registered.

A filtering method in the filtering processing unit 21 of the filtering device 20 according to the first embodiment will be described below with reference to FIGS. 3 to 8.

Figure 3:
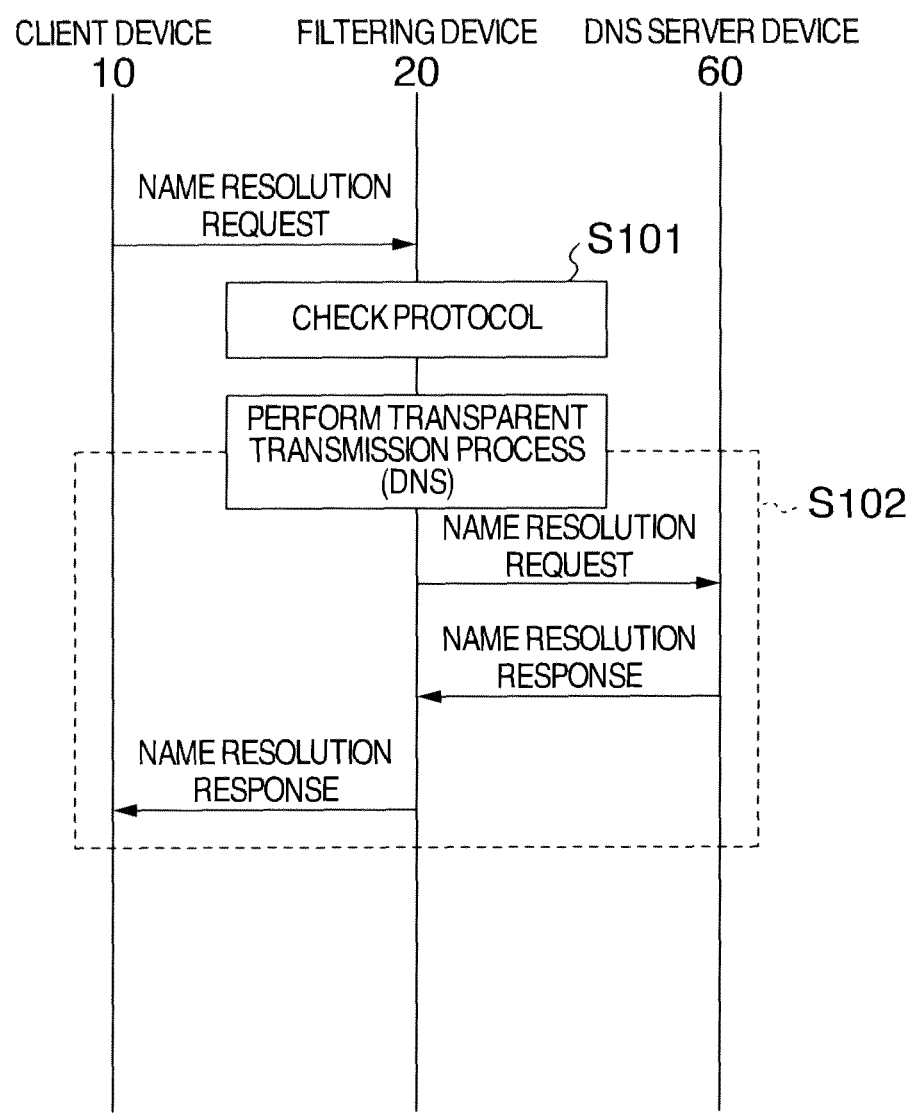
FIG. 3 illustrates a process sequence at the time of receiving a name resolution request according to a first embodiment.

FIG. 3 is a sequence diagram illustrating a process at the time of receiving a name resolution request.

When receiving a name resolution request from the client device 10, the filtering device 20 performs a determination process of a communication protocol (Step S101).

For example, the filtering device 20 checks a destination port number of a packet and performs a determination as a DNS protocol when it is No. 53 port. Alternatively, when the destination port number is port numbers except No. 80 port, the filtering device 20 performs a determination as protocols except the HTTP.

Subsequently, the filtering device 20 manages and identifies communication in combination of four factors, namely, a transmission source IP address, a transmission source port number, a transmission destination IP address, and a transmission destination port number. With relation to communication in which a protocol is checked once, the filtering device 20 skips a protocol check until the communication is completed.

When it is protocols except the HTTP, the filtering device 20 then performs a transparent transmission process (Step S102).

Figure 4:
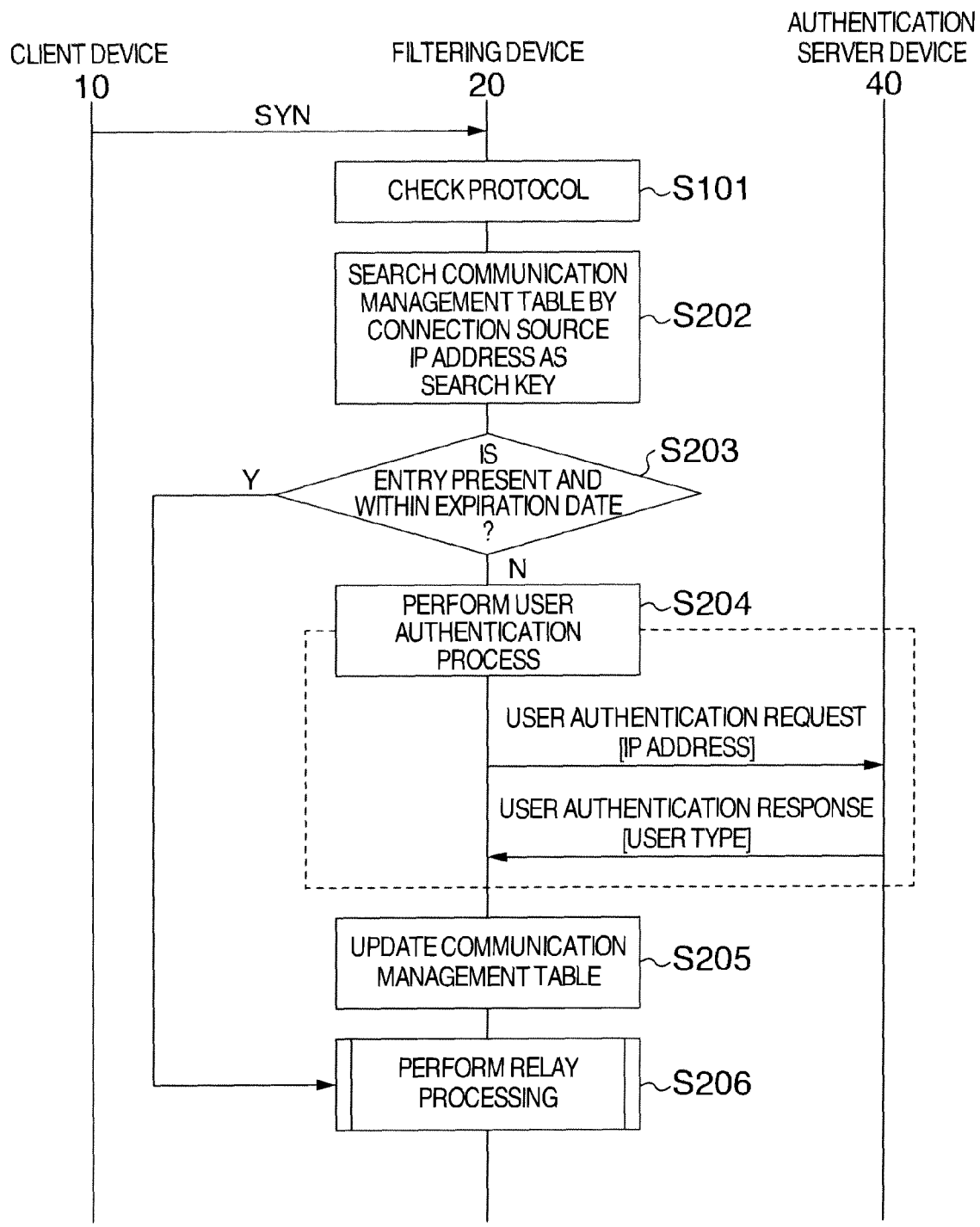
FIG. 4 illustrates a process sequence at the time receiving a TCP connection request according to a first embodiment.

FIG. 4 is a sequence diagram illustrating a process at the time of receiving a TCP connection request.

When receiving a SYN packet from the client device 10, the filtering device 20 performs a protocol check process (Step S101).

When determining that the protocol is an HTTP, the filtering device 20 uses as a search keyword a connection source IP address obtained from a connection source IP address header of the SYN packet, and searches the communication management table 221A (Step S202).

If the entry is present and is within the expiration date, the process proceeds to relay processing (Step S206). If not, the filtering device 20 creates an entry in the communication management table 221A. The filtering device 20 stores the connection source IP address obtained at step S202 in the connection source IP address field 2211, user type information indicating a filtering non-object in the user type field 2212, a connection destination IP address obtained from the transmission destination IP address header for SYN packets in the connection destination IP address field 2213, an access control parameter indicating the access control non-object in the access control parameter field 2214, a value of zero in the control counter 2215, and a value obtained by adding to the present date a valid duration previously set to the filtering device 20 by a setting file as an expiration date in the expiration date field 2216, respectively. The process proceeds to step S204 (Step S203).

Suppose here that an entry is present and a value stored in the expiration date field 2216 expires. In this case, a value obtained by adding a valid duration to the present date may be updated in the expiration date field 2216 as the expiration date, and further overwritten in the other fields 2211 to 2215. The filtering device 20 then transmits to the authentication server device 40 a user authentication request to which the connection source IP address information is given (Step S204).

The filtering device 20 obtains user type information from the user authentication response received from the authentication server device 40, and stores it in the user type field 2212 of the entry of the communication management table 221A created at step S204 (Step S205).

The process then proceeds to relay processing (Step S206).

Details of the relay processing (Step S206) will be described below with reference to FIG. 5.

With regard to the entry of the communication management table 221A, the filtering device 20 obtains user type information from the user type 2212 (Step S301), and checks whether the user type is a filtering object (Step S302).

If not, the filtering device 20 transmits and transfers communication data of the communication (Step S310). Here, the transparent transmission duration may be set to be until date and hour indicated by the expiration date 2216.

On the other hand, if so, the filtering device 20 checks whether information of the connection destination IP address 2213 is registered in the entry (Step S303). If not, the filtering device 20 registers the above information in the entry (Step S304).

The filtering device 20 then checks whether the access control parameter 2214 is a control object (Step S305).

If not, or if whether the access control parameter 2214 is a control object is not recorded, the process proceeds to the transparent transmission process (TCP connection establishment) (Step S309).

If so, the filtering device 20 obtains a value of the control counter 2215 (Step S306) and checks whether it is greater than a previously-registered threshold (Step S307). Here, the threshold may be described in a setting file of the filtering device 20, read from the setting file at the time of starting the filtering device 20, and stored in an area of the memory 1002.

If so, the process proceeds to proxy response processing (deemed filtering) (Step S308).

If not, the process proceeds to the transparent transmission process (TCP connection establishment) (Step S309).

Figure 6:
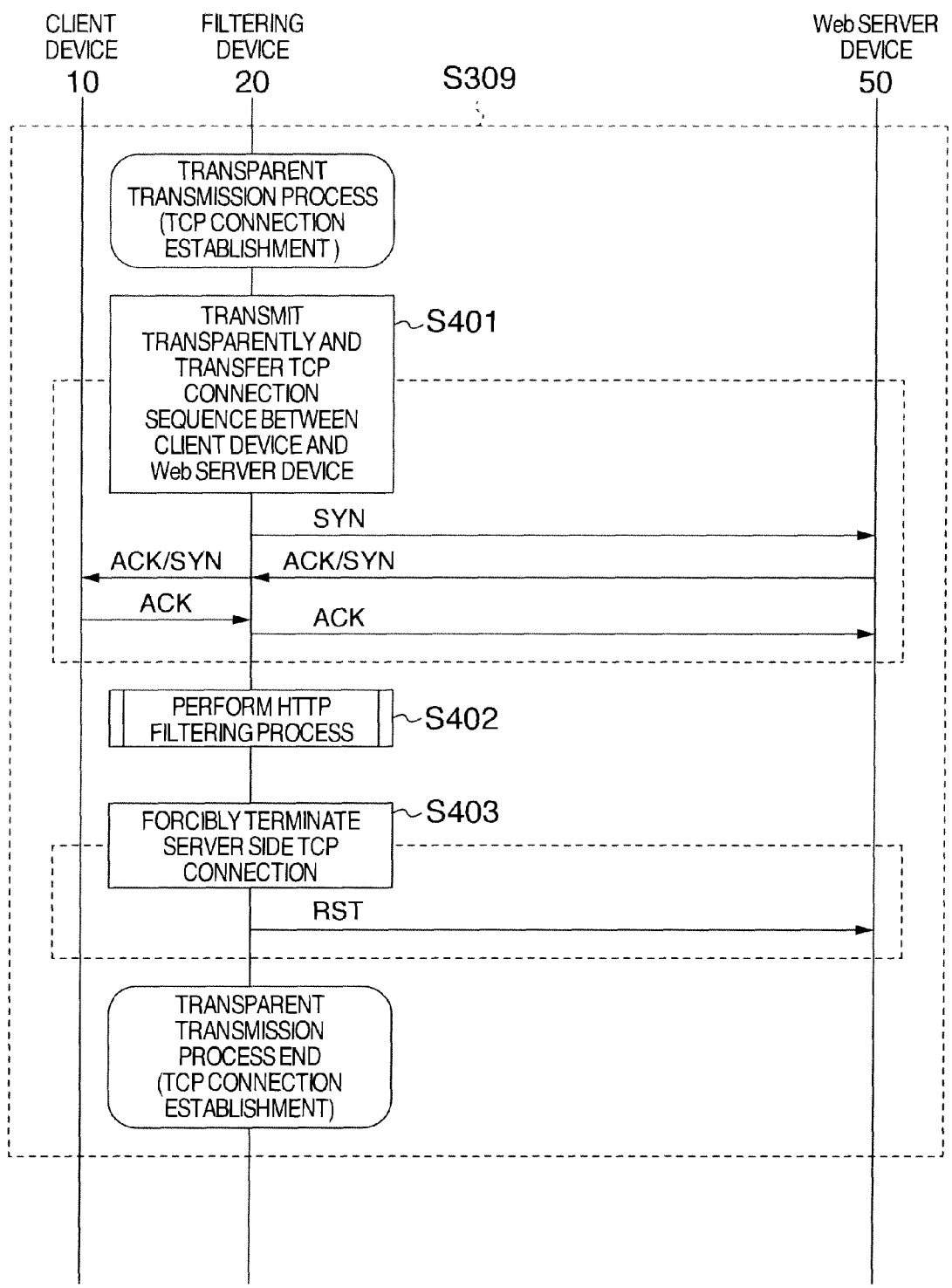
FIG. 6 illustrates a transparent transmission process (TCP connection establishment) sequence of a filtering device 20 according to a first embodiment.

Details of the transparent transmission process (TCP connection establishment) (Step S309) will be described below with reference to FIG. 6.

The filtering device 20 first transmits and transfers a TCP connection sequence (TCP 3way-handshake) between the client device 10 and the Web server device 50 in the communication (Step S401).

The filtering device 20 then performs an HTTP filtering process (Step S402), and finally transmits an RST packet for forcibly terminating a TCP connection of the server side (Step S403).

Figure 7:
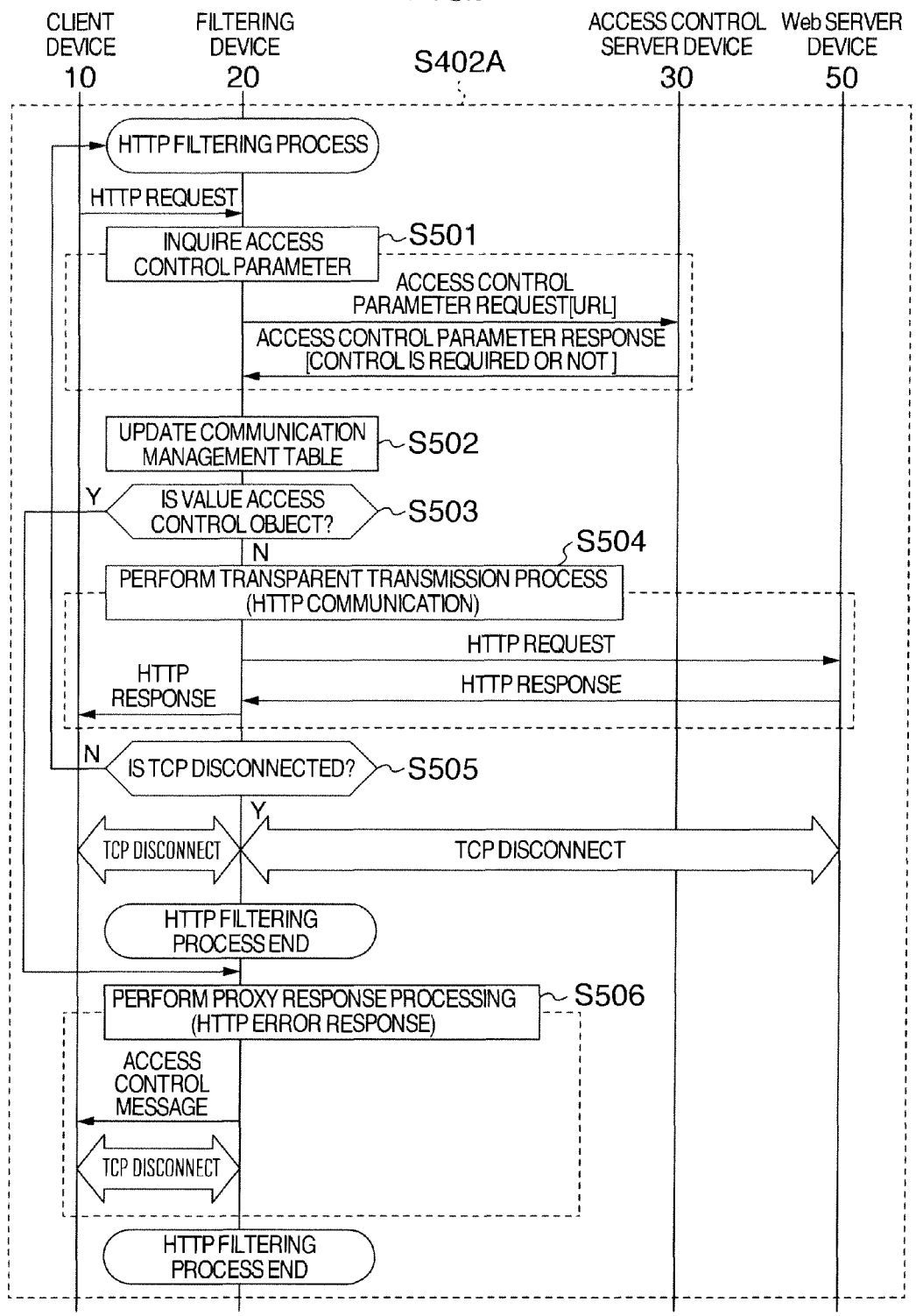
FIG. 7 illustrates an HTTP filtering process sequence of a filtering device 20 according to a first embodiment.

With regard to the foregoing HTTP filtering process (Step S402), details of step S402A according to the first embodiment will be described below with reference to FIG. 7.

When receiving the HTTP request, the filtering device 20 transmits the access control parameter on the URL described in a request line to the access control server device 30 for inquiry, and obtains the access control information (Step S501).

By using the obtained information, the filtering device 20 updates the access control parameter field 2214 of the communication management table 221A (in the case of blank spaces, freshly registers the above information) (Step S502).

Next, with reference to the access control information, the filtering device 20 checks a value of the access control parameter field 2214 and judges whether or not the value is an access control object (Step S503).

If the value is not an access control object, the filtering device 20 transmits the HTTP request to the Web server device 50 and transmits the HTTP response from the Web server device 50 to the client device 10 (transparent transmission process (HTTP communication)) (Step S504). When receiving the next HTTP request, the filtering device 20 then returns to step S501 and continues the process.

A TCP disconnect request is supposed to be received from the client device 10 or Web server device 50, or a given period of time is supposed to elapse (time out) while the filtering device 20 fails to communicate with the client device 10 and Web server device 50. In the above cases, the filtering device 20 considers the state as a TCP disconnect case and performs a TCP disconnect sequence to both of the client device 10 and the Web server device 50. If not, the filtering device 20 returns to step S501 and continues the process (Step S505).

If the value is an access control object, the filtering device 20 counts up a value of the control counter 2215 of the communication management table 221A. The filtering device 20 further responds as an HTTP response to the client device 10 an access control message to the effect that an access to the URL is controlled, and performs a TCP disconnect to the client device 10 (proxy response processing (HTTP error response)) (Step S506).

Figure 8:
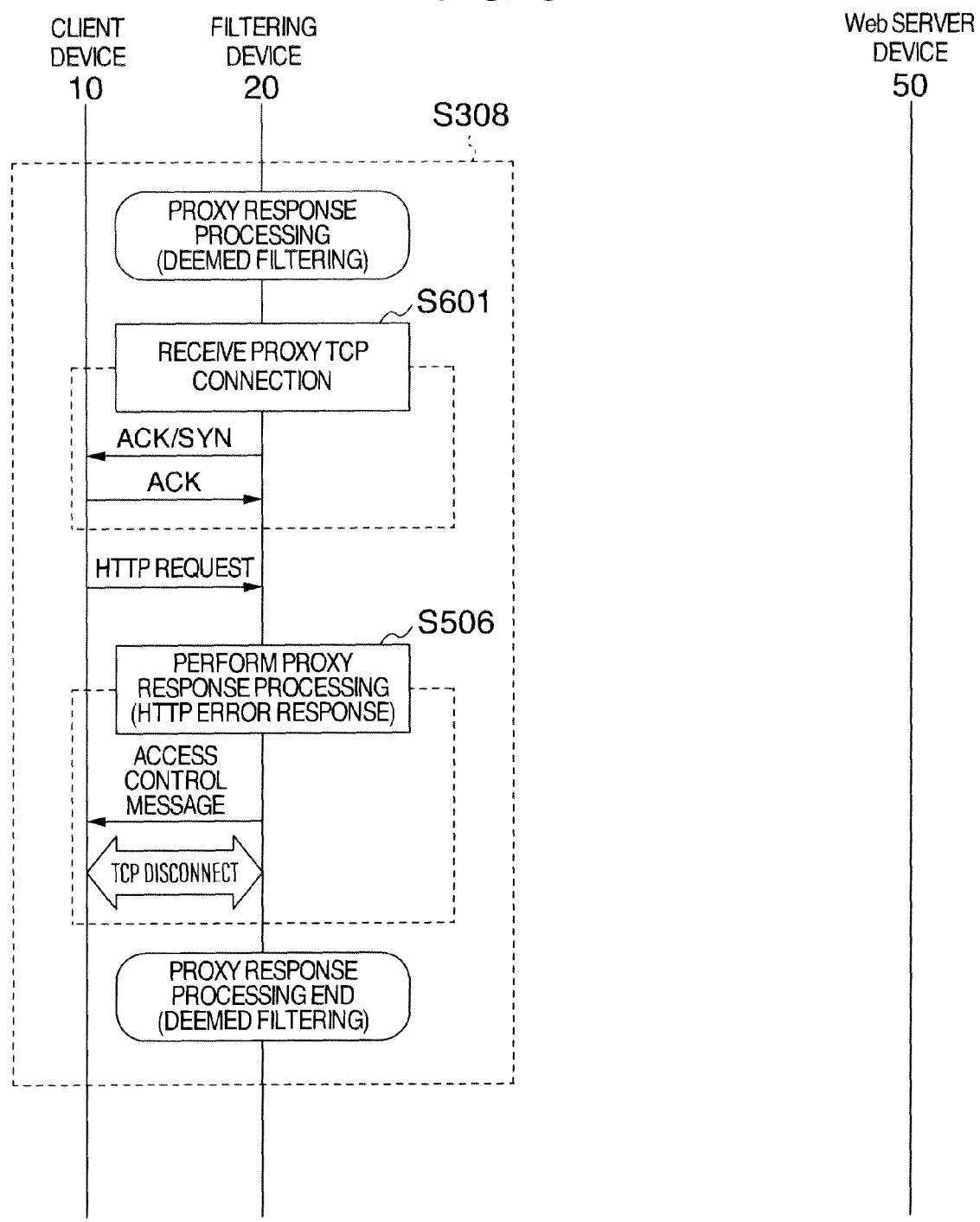
FIG. 8 illustrates a proxy response processing (deemed filtering) sequence of a filtering device 20 according to a first embodiment.

Details of the proxy response processing (deemed filtering) (Step S308) will be described below with reference to FIG. 8.

To an SYN packet for the TCP connection received from the client device 10, the filtering device 20 performs a TCP connection reception sequence (TCP 3way-handshake) which its own device is coupled as a termination (Step S601), and then performs the proxy response processing (HTTP error response) (Step S506).

As can be seen from the above sequence, in a method in which the TCP termination processing is not performed at normal times, and the TCP termination processing is performed in the case where a URL in a request line of an HTTP access from reception packets is extracted, a passage/access refusal determination of URL is performed, and a determination result is an access refusal, performing TCP termination processing without performing the TCP termination processing at normal time, since frequent TCP connections to a Web server which provides access control object data are able to be disconnected, the present embodiment has an effect capable of avoiding a risk of being erroneously recognized as a DoS attack to a Web server manager.

Second Embodiment

A second embodiment will be described with reference to FIG. 9.

In the present embodiment, in addition to a configuration according to the first embodiment, a filtering system 1 further includes an access control parameter storage unit 23.

A configuration of the communication management table 221 included in the communication management information storage unit 22 is further changed.

A configuration of the communication management table 221 (referred to as 221B) according to the second embodiment will be described below with reference to FIG. 10.

The communication management table 221B has a connection source IP address field 2211, a user type field 2212, connection destination information 2217, a control counter 2215, and an expiration date field 2216. The connection source IP address field 2211, the user type field 2212, the control counter 2215, and the expiration date field 2216 are the same as those of the first embodiment.

The connection destination information 2217 is an area for storing entry numbers of an access control management table 231 included in the access control parameter storage unit 23.

The access control management table 231 will be described with reference to FIG. 11.

The access control management table 231 manages detailed information on the connection destination Web server device 50.

The access control management table 231 has a destination host name field 2311, a plurality of IP address fields 2312, an access control parameter field 2313, and an expiration date field 2314.

The access control parameter field 2313 is an area for storing the same information as that of the access control parameter field 2214 according to the first embodiment.

Figure 12:
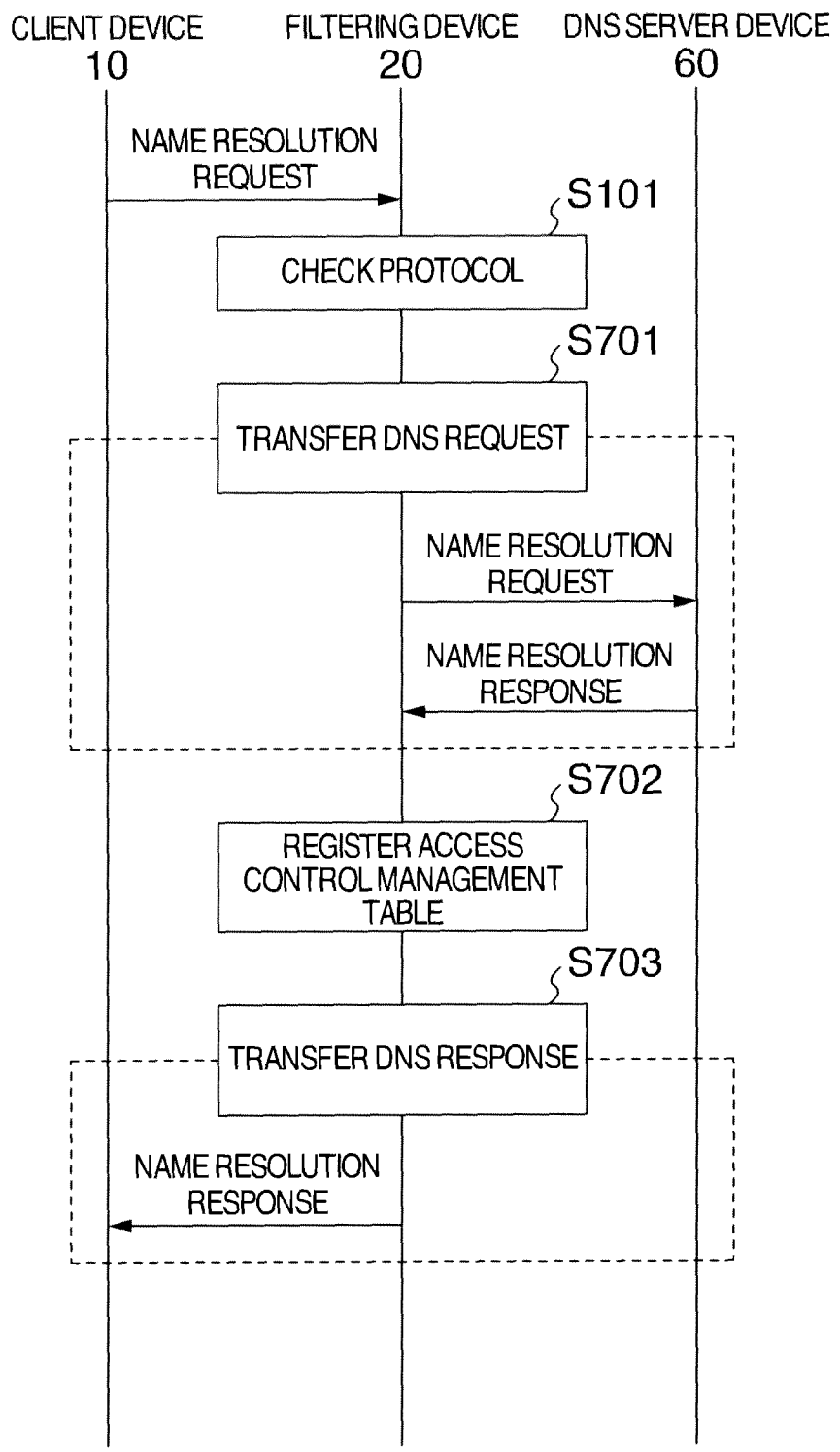
FIG. 12 illustrates a process sequence at the time of receiving a name resolution request according to a second embodiment.

Details of a process at the time of receiving a name resolution request will be described below with reference to FIG. 12.

When receiving a name resolution request from the client device 10, the filtering device 20 performs determination processing of a communication protocol (Step S101).

Here, the filtering device 20 checks a destination port number of a packet and, the destination port number is a No. 53 port, determines that a DNS protocol is used.

When the DNS protocol is used, the filtering device 20 transfers a name resolution request to the DNS server device 60 and receives a name resolution response (Step S701).

The filtering device 20 then analyzes data of the received name resolution response, registers a host name as a name resolution object in the destination host name field 2311 and IP address information in the IP address field 2312, and updates date and hour of the expiration date 2314 (Step S702). When an unregistered IP address is responded from the DNS server device 60 through the name resolution response, the filtering device 20 freshly adds it to the IP address field 2312 and registers a plurality of IP addresses.

The filtering device 20 then transfers the name resolution response to the client device 10 (Step S703).

Figure 5:
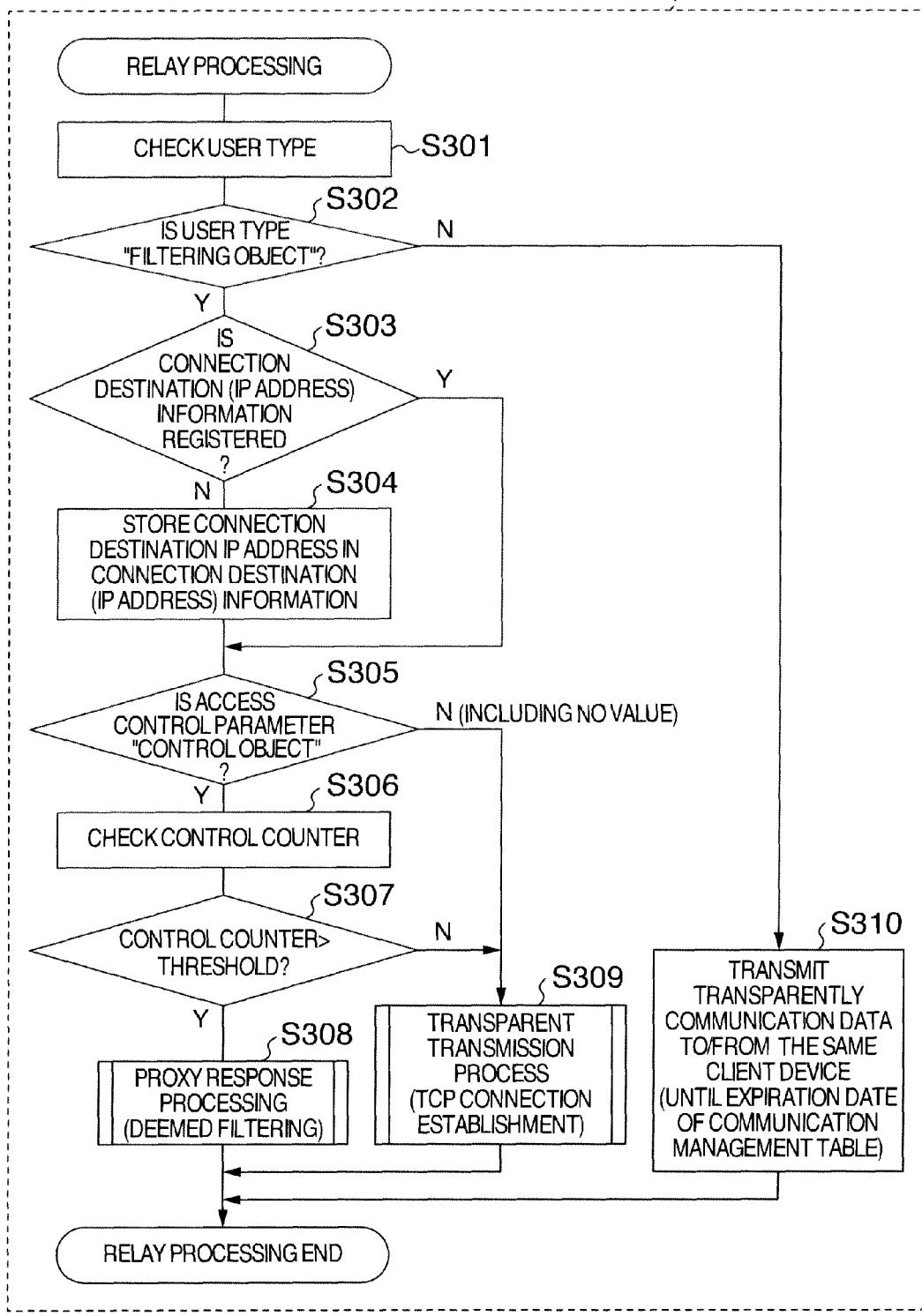
FIG. 5 illustrates a flowchart of relay processing of a filtering device 20 according to a first embodiment.

In the process of step S305 at the relay processing (Step S206) of FIG. 5, the filtering device 20 searches the IP address field 2312 of the access control management table 231 by using the destination IP address as a search keyword. The filtering device 20 determines whether the value is a control object by using the access control parameter 2313 of the matched entry. When an IP address is registered in the plurality of IP address fields 2312 of one entry, the filtering device 20 here searches all the IP address fields 2312.

Figure 13:
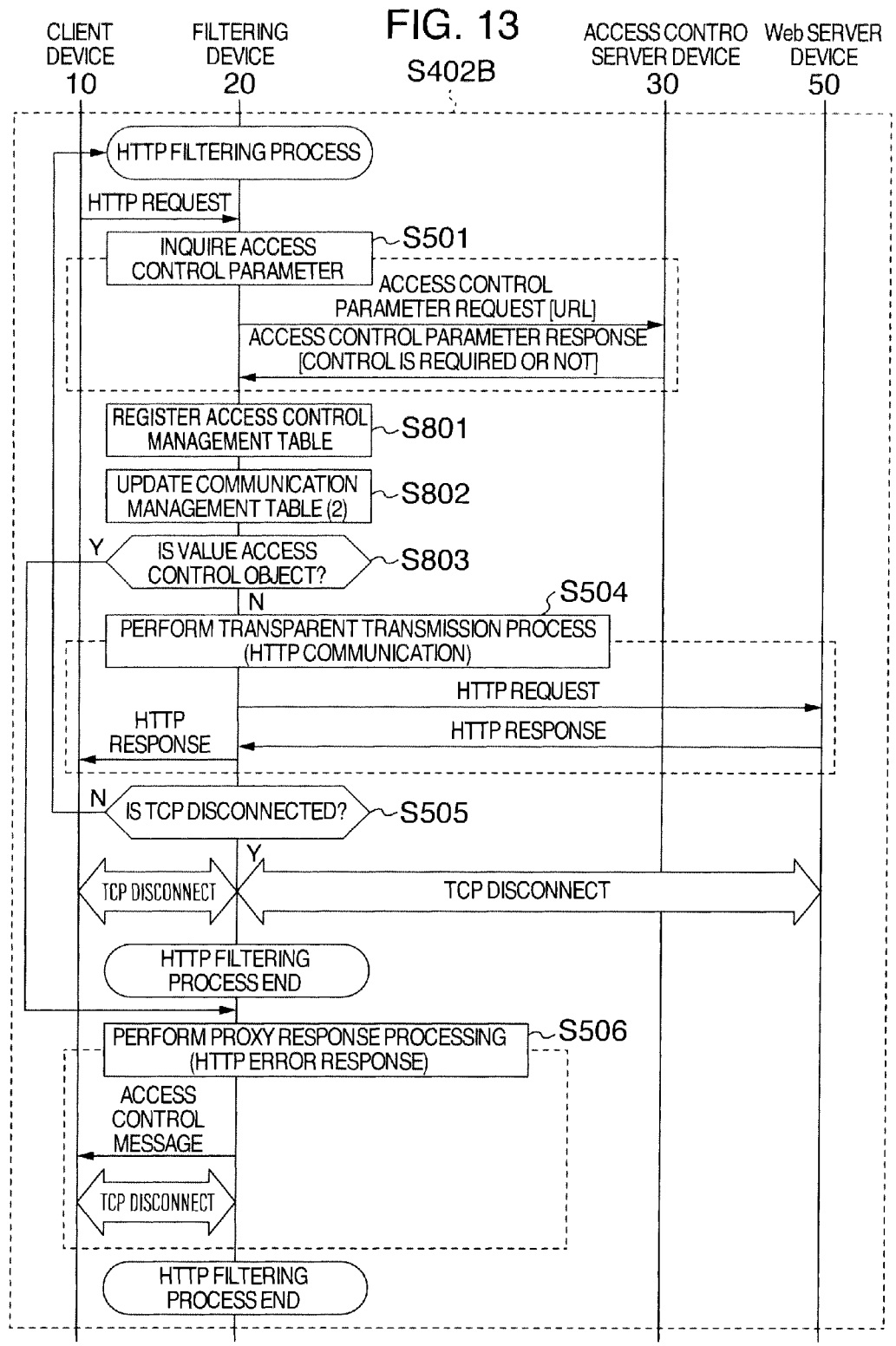
FIG. 13 illustrates an HTTP filtering process sequence of a filtering device 20 according to a second embodiment.

The HTTP filtering process according to the second embodiment will be described below with reference to FIG. 13.

When receiving the HTTP request, the filtering device 20 obtains access control information (Step S501).

The filtering device 20 then updates the access control parameter field 2313 of the access control parameter management table 231 by using the obtained information (Step S801).

The filtering device 20 then stores an entry ID of the entry updated at step S801 in the connection destination information 2217 of the communication management table 221B (Step S802).

Next, the filtering device 20 checks a value of the access control parameter field 2313 and determines whether a URL is an access control object (Step S803).

When the URL is not an access control object based on the access control information, the filtering device 20 transmits the HTTP request to the Web server device 50 and transmits an HTTP response from the Web server device 50 to the client device 10 (transparent transmission process (HTTP communication)) (Step S504). When receiving the next HTTP request, the filtering device 20 then returns to step S501 and continues the process.

A TCP disconnect request is supposed to be received from the client device 10 or Web server device 50, or a given period of time is supposed to elapse (time out) while the filtering device 20 fails to communicate with the client device 10 and Web server device 50. In the above cases, the filtering device 20 considers the state as a TCP disconnect case and performs a TCP disconnect sequence to both of the client device 10 and the Web server device 50. If not, the filtering device 20 returns to step S501 and continues the process (Step S505).

If the URL is an access control object, the filtering device 20 counts up a value of the control counter 2215 of the communication management table 221B. The filtering device 20 further responds as an HTTP response to the client device 10 an access control message to the effect that an access to the URL is controlled, and performs a TCP disconnect to the client device 10 (proxy response processing (HTTP error response)) (Step S506).

As can be seen from the above sequence, the present embodiment has an effect that when the plurality of Web server devices 50 which provides the same access control object data are present, an access to the access control object data of the Web server device 50 group is treated as the same and a TCP connection to the Web server device 50 group is disconnected.

Third Embodiment

Figure 14:
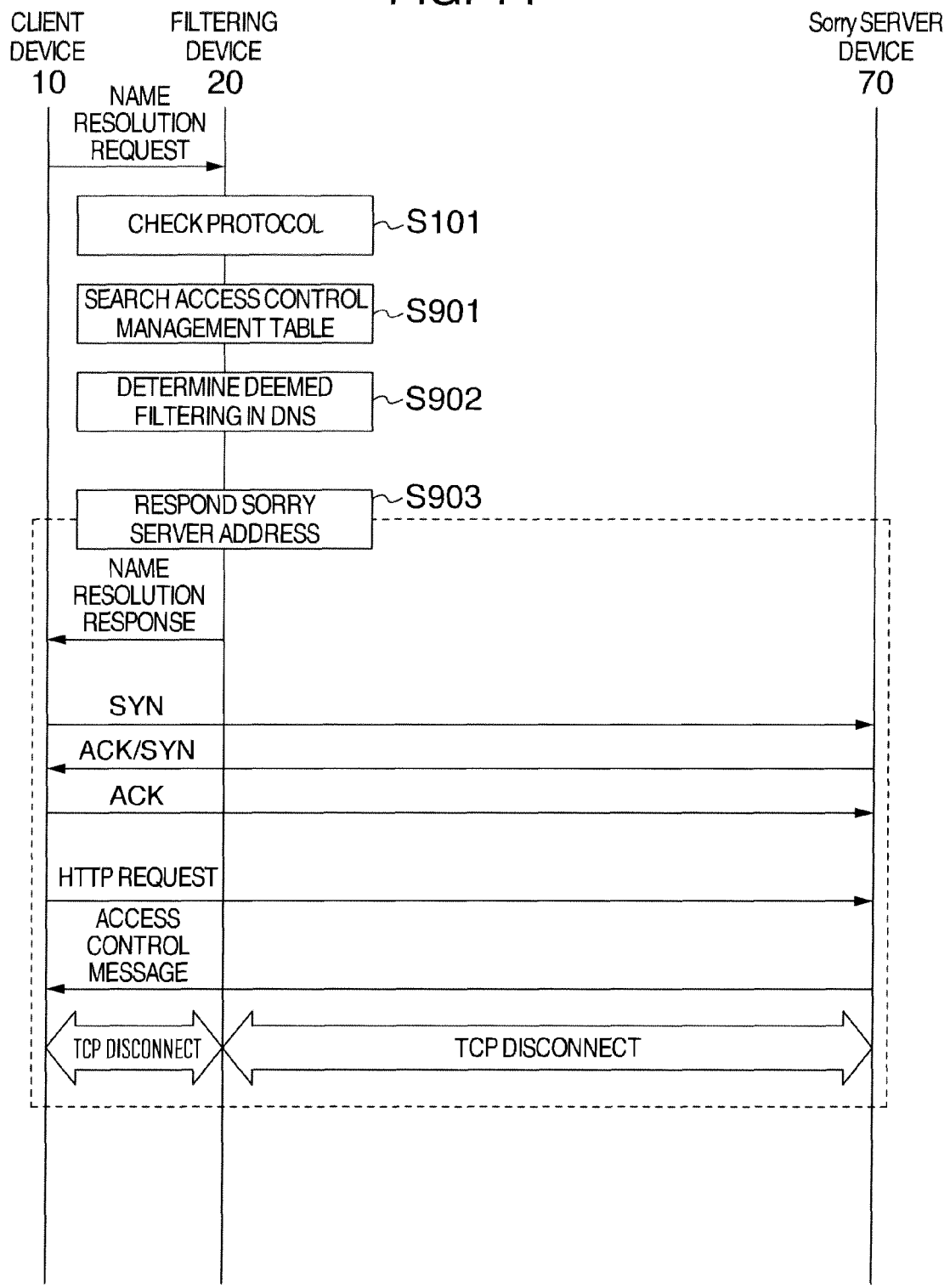
FIG. 14 illustrates a process sequence at the time of receiving a name resolution request according to a third embodiment.

A third embodiment will be described with reference to FIGS. 9 and 14.

Figure 9:
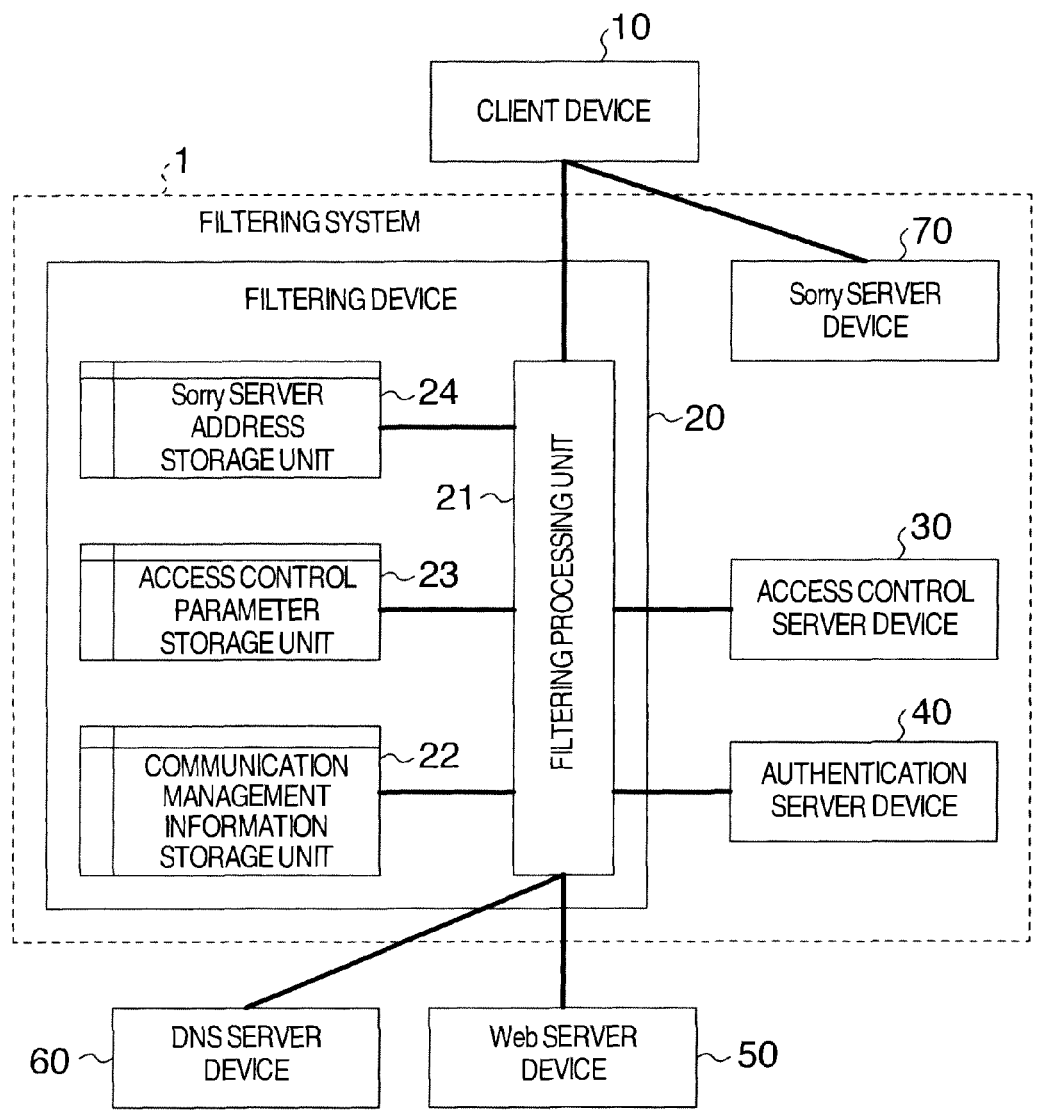
FIG. 9 illustrates a configuration example of a filtering system according to a second embodiment.

In the present embodiment, in FIG. 9, in addition to the configuration according to the second embodiment, a filtering system 1 includes a Sorry server address storage unit 24 and a Sorry server device 70.

When receiving an HTTP access from the client device 10, the Sorry server device 70 is a server device which always responds an access control message for notifying a user that an access to the access destination is controlled. The foregoing access control message is, for example, a sentence such as "an access to the Web site is controlled".

The Sorry server address storage unit 24 is an area for storing an IP address of the Sorry server device 70. Here, an IP address of the Sorry server may be described in a setting file of the filtering device 20, read from the setting file at the time of starting the filtering device 20, and stored in the Sorry server address storage unit 24.

The process at the time of receiving the name resolution request in the third embodiment will be described with reference to FIG. 14.

When receiving a name resolution request from the client device 10, the filtering device 20 performs determination processing of a communication protocol (Step S101).

Here, the filtering device 20 checks a destination port number of a packet and when the destination port number is a No. 53 port, determines that a DNS protocol is used.

When the DNS protocol is used the filtering device 20 uses a host name of a name resolution object as a search keyword and searches the destination host name field 2311 of the access control management table 231 (Step S901).

The access control parameter 2313 of the entry obtained by performing a search is a control object, and by using the transmission source IP address of the name resolution request as a search keyword, the filtering device 20 searches the connection source IP address field 2211 of the communication management table 221B, and determines whether the user type 2212 of the obtained entry is a filtering object (Step S902).

When satisfying conditions, the filtering device 20 responds an IP address of the Sorry server stored in the Sorry server address storage unit 24 to the client device 10 as a name resolution response (Step S903).

As can be seen from the above sequence, the present embodiment has an effect that the client device 10 directly performs HTTP communication with the Sorry server device 70 and receives an access control message, and therefore deletes traffic to the filtering device 20.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A network system comprising:
a client device;
a service server device; and
a filtering device including a first function of relaying a TCP connection established between the client device and the service server device, and an HTTP request and an HTTP response transmitted and received by using the TCP connection, and
a second function of disconnecting an access to an access control object service provided by the service server device from the client device,
wherein:
the filtering device includes a filtering processing unit which is configured to perform detection processing and disconnect processing;
the detection processing is a process for detecting HTTP accesses to the same access control object service provided by the service server device from the same client device through an establishment request of the TCP connection used by the HTTP access; and
the disconnect processing is a process in which when an establishment request of the TCP connection used by the HTTP accesses is detected through the detection processing, establishment and disconnect of the TCP connection in which the filtering device is coupled as a termination are performed without transferring an establishment request of the TCP connection to the service server device.

2. The network system according to claim 1, wherein in the disconnect processing, when receiving an HTTP request from the client device using the established TCP connection, the filtering processing unit transmits an access control message to the client device, and disconnects the TCP connection.

3. The network system according to claim 2,
wherein:
in the detection processing,
the filtering processing unit is configured to transfer an establishment request of the TCP connection to the service server device and to establish the requested TCP connection when determining that an establishment request of the TCP connection is not an establishment request of the TCP connection in which the HTTP accesses to the access control object service are used; and
to count up the number of the HTTP requests to determine whether the HTTP request is the accesses when the HTTP request in which the established TCP connection is used is an HTTP request to the access control object service.

4. The network system according to claim 2, wherein the filtering processing unit is configured to correspondingly manage a connection source IP address of the client device, a connection destination IP address to service provided by the service server device, and information indicating whether the service provided by an access to the connection destination IP address is an access control object through a user of the client device.

5. The network system according to claim 1,
wherein:
in the detection processing,
the filtering processing unit is configured to transfer an establishment request of the TCP connection to the service server device and to establish the requested TCP connection when determining that an establishment request of the TCP connection is not an establishment request of the TCP connection in which the HTTP accesses to the access control object service are used; and
to count up the number of the HTTP requests to determine whether the HTTP request is the accesses when the HTTP request in which the established TCP connection is used is an HTTP request to the access control object service.

6. The network system according to claim 5, wherein the filtering processing unit is configured to correspondingly manage a connection source IP address of the client device, a connection destination IP address to service provided by the service server device, and information indicating whether the service provided by an access to the connection destination IP address is an access control object through a user of the client device.

7. The network system according to claim 1, wherein the filtering processing unit is configured to correspondingly manage a connection source IP address of the client device, a connection destination IP address to service provided by the service server device, and information indicating whether the service provided by an access to the connection destination IP address is an access control object through a user of the client device.

8. The network system according to claim 7,
wherein:
in the detection processing,
the filtering processing unit is configured to transfer a name resolution request received from the client device to a name resolution server and to receive a name resolution response from the name resolution server; and
to set a connection destination IP address included in the received name resolution response to the managed connection destination IP address, and to correspondingly manage the connection destination IP address and a URL included in the name resolution request.

9. The network system according to claim 8, wherein in the detection processing, the filtering processing unit is configured to correspondingly manage one of the managed URLs and a plurality of connection destination IP addresses included in the name resolution response received from the name resolution server.

10. The network system according to claim 1,
wherein:
in the detection processing,
the filtering processing unit is configured to identify the client device and the service server device;
to preserve as a counter value the number of the HTTP requests for a given length of time from the connection source IP address of the client device to the access control object data; and
to consider that the accesses occur when the counter value is greater than a certain threshold.

11. A network system comprising:
a client device;
a service server device; and
a filtering device including a first function of relaying an HTTP request and an HTTP response between the client device and the service server device and a second function of disconnecting an access to an access control object service provided by the service server device from the client device,
wherein:
the filtering device has a filtering processing unit which is configured to perform detection processing and disconnect processing;
to correspondingly manage a connection source IP address of the client device, a URL included in a name resolution request received from the client device, a connection destination IP address included in a name resolution response received from a name resolution server, and information indicating whether the service provided by an access to the connection destination IP address is an access control object through a user of the client device;
to detect a name resolution request of the service server device from the client device in the detection processing, and
to disconnect an access to the access control object service when responding an IP address of another server device different from the service server device as a response for the name resolution request in the disconnect processing.

12. The network system according to claim 11, further comprising a Sorry server device which is configured to respond an access control message,
wherein:
in the disconnect processing,
the filtering processing unit is configured to respond an IP address of the Sorry server device to the client device as a response for the name resolution request; and
to allow the client device to perform an establishment request of the TCP connection and an HTTP request between its own device and the Sorry server device.

* * * * *